United States Patent
Potts

(10) Patent No.: US 9,160,185 B2
(45) Date of Patent: Oct. 13, 2015

(54) APPARATUS AND METHOD FOR ACTIVE BALANCING OF SERIES CELLS AND SERIES PACKS IN A BATTERY SYSTEM

(71) Applicant: Eetrex, Inc., Boulder, CO (US)

(72) Inventor: Dennis L. Potts, Boulder, CO (US)

(73) Assignee: Eetrex, Inc., Boulder, CO (US)

( * ) Notice: Subject to any disclaimer, the term of this patent is extended or adjusted under 35 U.S.C. 154(b) by 310 days.

(21) Appl. No.: 13/722,673

(22) Filed: Dec. 20, 2012

(65) Prior Publication Data

US 2013/0187605 A1 Jul. 25, 2013

Related U.S. Application Data

(60) Provisional application No. 61/579,928, filed on Dec. 23, 2011.

(51) Int. Cl.
*H02J 7/00* (2006.01)
*B60L 11/18* (2006.01)
*H01M 10/42* (2006.01)

(52) U.S. Cl.
CPC ........... *H02J 7/0052* (2013.01); *B60L 11/1859* (2013.01); *B60L 11/1866* (2013.01); *H01M 10/425* (2013.01); *H01M 10/4207* (2013.01); *H02J 7/0019* (2013.01); *B60L 2240/547* (2013.01); *B60L 2240/549* (2013.01); *H01M 2010/4271* (2013.01); *H02J 2007/0059* (2013.01); *Y02T 10/7005* (2013.01); *Y02T 10/7055* (2013.01); *Y02T 10/7061* (2013.01); *Y02T 10/92* (2013.01)

(58) Field of Classification Search
None
See application file for complete search history.

(56) References Cited

U.S. PATENT DOCUMENTS

| | | | | |
|---|---|---|---|---|
| 5,086,382 | A * | 2/1992 | Feldtkeller et al. | 363/21.16 |
| 6,664,762 | B2 * | 12/2003 | Kutkut | 320/116 |
| 8,427,107 | B2 * | 4/2013 | Firehammer | 320/128 |
| 8,541,979 | B2 * | 9/2013 | Firehammer et al. | 320/118 |
| 8,692,516 | B2 * | 4/2014 | Nork et al. | 320/118 |
| 8,710,801 | B2 * | 4/2014 | Schwartz | 320/119 |
| 2011/0115436 | A1 * | 5/2011 | Zhang et al. | 320/134 |
| 2012/0249055 | A1 * | 10/2012 | Wade | 320/107 |
| 2012/0293129 | A1 * | 11/2012 | Naghshtabrizi et al. | 320/118 |
| 2013/0002201 | A1 * | 1/2013 | Bodkin et al. | 320/118 |
| 2013/0214724 | A1 * | 8/2013 | Schwartz | 320/103 |

OTHER PUBLICATIONS

Wei et al., "The Research of Vehicle Power Li-ion Battery Pack Balancing Method," The Ninth Int'l Conference on electronic Measurement & Instruments, 2009 IEEE, pp. 498-502.*

* cited by examiner

*Primary Examiner* — Leigh Garbowski
(74) *Attorney, Agent, or Firm* — Polsinelli PC

(57) ABSTRACT

An active balancing and battery charging system for a battery including a plurality of packs made up of cells. An H-bridge circuit having a nominal system voltage as an input generates a square wave output to a plurality of step-down transformers each associated with a pack, where the plurality of step-down transformers provide an active balancing voltage of about the nominal pack voltage. Each pack may include a balancing transformer including a common primary coil receiving the active balancing voltage from the associated step-down transformer or the pack itself. The balancing transformer also includes a plurality of secondary coils each associated with the respective plurality of cells of the pack. A voltage induced in the secondary coils causes a discrete charge current to flow to any cells in the pack that are undercharged relative to other cells.

15 Claims, 2 Drawing Sheets

APPARATUS AND METHOD FOR ACTIVE BALANCING OF SERIES CELLS AND SERIES PACKS IN A BATTERY SYSTEM

CROSS-REFERENCE TO RELATED APPLICATION

The present application claims priority under 35 U.S.C. §119(e) to provisional application No. 61/579,928 titled "Apparatus and Method for Active Balancing of Series Cells and Series Packs in a Battery System," filed on Dec. 23, 2011, and which is hereby incorporated by reference herein.

BACKGROUND

Larger and evermore complex battery systems composed of many individual cells are being constructed to provide larger voltages and powers, such as used in electric and hybrid vehicles, backup stationary power for computing centers, homes and whole neighborhoods. Dividing the battery into packs of smaller groups of cells can be advantageous to assembly, safety, servicing and maintenance. However, large battery systems composed of one or many cells in parallel (a module), then connected in series configurations for higher voltages, typically are limited by the weakest module and/or cell in the amount of current that the battery system can supply. Battery management systems have been developed to balance these modules so they remain as close to equal charge as possible to provide the best performance. As these batteries are constructed with larger voltages, it is recommended to break the battery into separated lower voltage packs connected in series, so each pack works at reduced voltages, allowing lower cost and often fewer components to be used in the construction. Active balancing is more efficient than passive load balancing of cells in maintaining optimal battery condition.

SUMMARY

Aspects of the present disclosure involve active balancing apparatus including a battery system having a nominal system voltage. The battery system may further comprise a plurality of packs including a plurality of cells. The packs have nominal voltages that when added substantially equal the nominal system voltage. The balancing apparatus further includes an H-bridge circuit having the nominal system voltage as an input where the H-bridge generates a differential alternating square wave voltage output to a plurality of step-down transformers each associated with a pack and where the plurality of step-down transformers provide an active balancing voltage of about the associated nominal pack voltage. Finally, the apparatus also includes a plurality of balancing transformers each associated with a respective pack, the plurality of balancing transformers each including a common primary coil receiving the active balancing voltage from the associated step-down transformer or the pack, and a plurality of secondary coils each associated with the respective plurality of cells of the pack.

Aspects of the present disclosure also involve a charge balancing circuit comprising a transformer including a primary winding and a plurality of secondary windings with the primary winding coupled across the battery system and the plurality of secondary windings each connected across a respective discrete portion of a battery pack. The charge balancing circuit also includes a plurality of diodes coupled between the plurality of secondary windings and the respective discrete portion of the battery pack. Finally, the charge balancing circuit also may include at least one switch configured to selectively control current flow from the battery system through the primary winding whereby discontinuing a current flow through the primary winding causes charge current to flow into at least one of the plurality of discrete portions, wherein the at least one discrete portion has a lesser charger relative to other portions.

FIGURE DESCRIPTIONS

DETAILED DESCRIPTION

One aspect of this disclosure involves an active balancing method and charging architecture specifically designed for a flexible number of battery packs for different applications, with a combination of central and independent monitoring and control. With battery circuitry broken up between several packs, a charge balancing scheme is needed within each pack. Aspects of the present disclosure use a combination of either internal or external power to actively balance each cell or module in a pack and also each pack in a battery system. A flexible means to easily adjust the system voltage and the number of packs for different applications is also described.

Figures 1A, 1B:
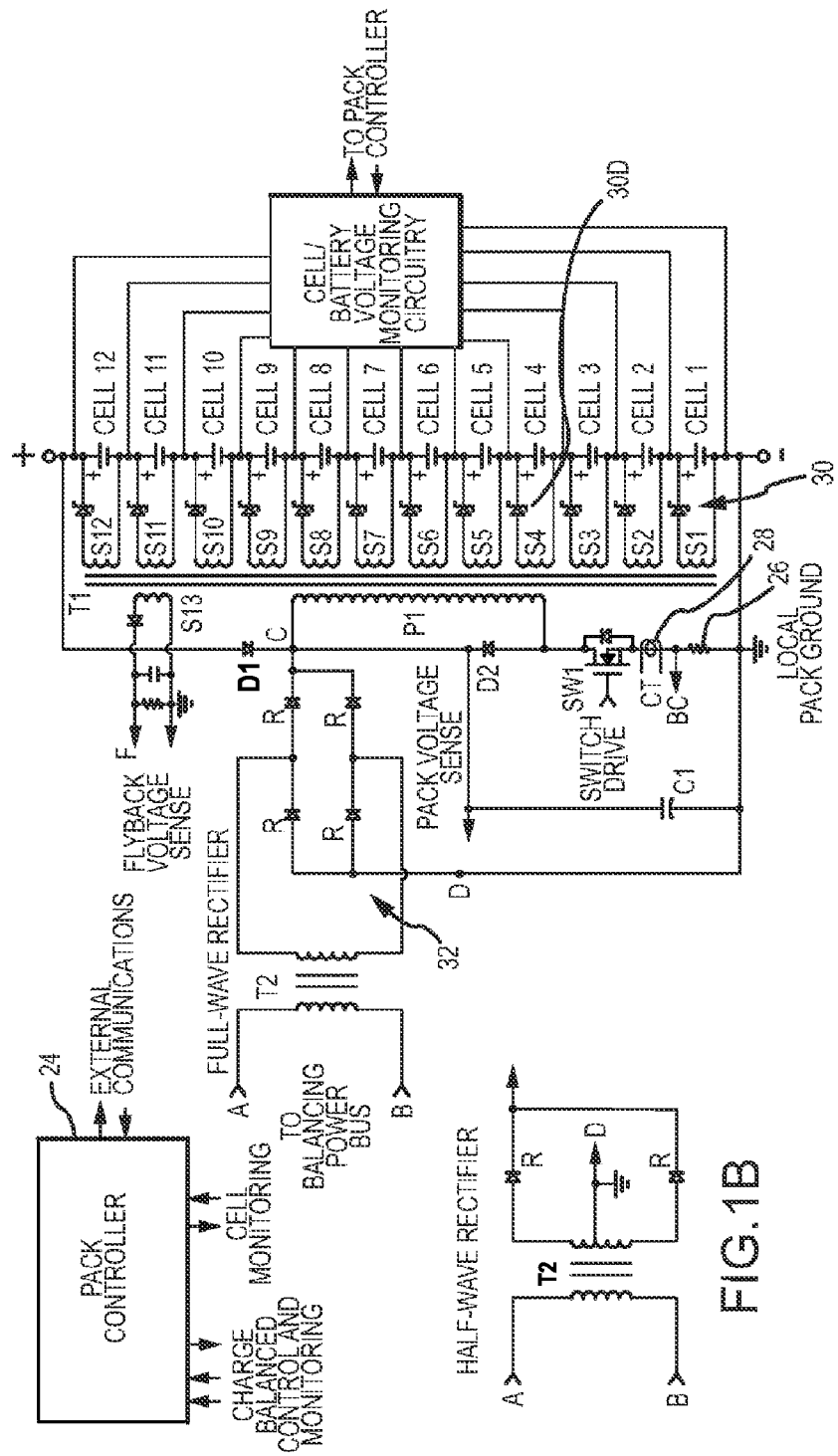
FIG. 1A is a drawing showing an active battery pack balancing circuit with various monitoring and rectifying techniques.
FIG. 1B is a drawing of a half-wave rectifier that may be employed in the circuit illustrated in FIG. 1A.
Figure 2:
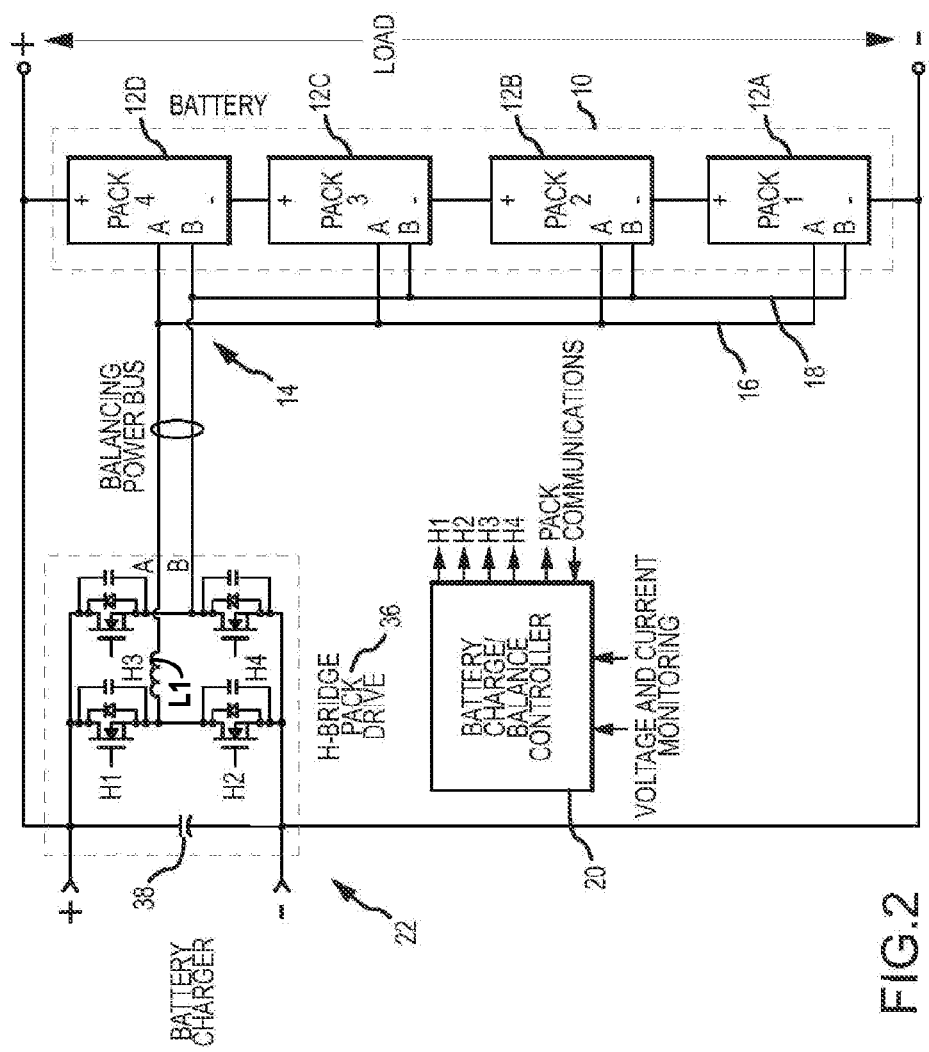
FIG. 2 is a drawing showing interconnect wiring and an external charge balancing supply drive circuit that may be used to supply charge power to the battery pack balancing circuit illustrated in FIG. 1A.

For purposes of illustration, an active balancing architecture is illustrated in FIGS. 1 and 2, along with other features. The system shown in FIG. 2 involves a representative 153.6 volt battery 10 where the battery voltage is achieved by connecting four (4) 38.4 volt battery packs 12A-12D in series. Each pack, in this representative example, includes twelve (12) cells (labeled cell1-cell12) or modules of 3.2 volts each, also connected in series. The active balancing circuit illustrated in FIG. 1 includes one of the four packs and the 12 cells of the one pack.

To obtain a 153.6 volt pack, the four 38.4 volt packs are connected in series as shown in FIG. 2. A balancing power bus 14 is coupled between a single H-bridge 36 pack drive and the four packs 12A-12D. The power bus provides power to a transformer T1 (FIG. 1) of each pack to provide balancing. While each pack could have its own H-bridge to drive each transformer, fewer parts are needed if, as in the example of FIG. 2, only one drive circuit is used. The H-bridge forms part of a battery charger 22 that is used to provide charge current to the battery for the purpose of charging the pack. The battery charger receives power from some external source. Generally speaking, an H-bridge includes four switches H1-H4, connected in an H-bridge configuration, where each switch may be controlled. The switches may involve include one or more switches in parallel, and may include MOSFET devices with integrated or separate diodes and or capacitors across the drain and source. In the illustrated example, a link capacitor 38 is applied across the H-bridge. Other forms of inverters, bridges or H-bridge configurations may also be used. The H-bridge 36 supplies a controllable square wave or other time varying signal to the balancing power bus 14, and the balancing power bus provides isolated charge power to the collection of four sub-packs.

In one example, each pack (12A-12D) has 2 terminals, labeled A and B, respectively. Each A terminal is connected with a first common line 16 of the bus 14, and each B terminal is connected with a second common line 18 of the bus 14. Similarly, the first common line of the bus is coupled with the H-bridge 16 between gates H1 and H2 of the bridge, and the second common line of the bus is coupled between gates H3 and H4 of the bridge. An inductor L1 may be included between H1, H2 and the first common line 16.

Not shown in the drawings are communications and cabling between a central controller 20 and the individual battery packs 12A-12D, along with detailed control and monitoring circuits such as microprocessors, voltage and current monitoring. As illustrated, the central controller may control battery charging by providing appropriate control signals to the switches H1-H4 of the H-bridge (e.g., PWM signals) may monitor and use measured voltages and currents from the system, and may provide control signals and receive information from individual pack controllers 24. Many such circuits and devices are applicable and some representative examples and/or functionality are described below.

Before describing the operation of active balancing circuit, the general meaning of an unbalanced battery will be described. Generally speaking, a battery is unbalanced when cells or packs that form the battery have different states of charge. Often, a battery becomes unbalanced as it cycles through charge and discharge cycles, and small differences in individual cell performance becomes exaggerated, and those differences are reflected in the state of charge differences amongst the cells that form the pack. When such a condition exists, battery performance is degraded as the battery itself, packs and cells, may not fully charge, may overcharge, may not fully discharge, may overdischarge, etc. Each of these conditions involves suboptimal battery performance and/or may damage the battery, packs, and/or individual cells. In the illustrated architecture and as discussed in more detail below, with or without a battery charger, the system could be commanded to balance itself resulting in the cells having substantially the same state of charge. Balancing with the battery charger involves supplying a charge current for an external source to the packs or cells to charge those targeted cells that are below some level. Balancing without the battery charger involves moving charge current from a cell with a higher charge to those cells with a lower charge. The two modes may be used alone or in combination, meaning charge current may be moved among cells in conjunction with charge current supplied from an external source through the battery charger.

Referring to FIG. 1, one mode of active balancing will now be described. First, it should be noted that the cells (cell1-cell12) are connected in series. The local pack controller 24 receives an external charge controller command, such as from the battery charger, to balance itself. Alternatively, the pack controller may be programmed or otherwise configured to balance itself based on various possible criteria such as detecting that the pack is unbalanced at the completion of a charge cycle or during a charge cycle, or simply as a set schedule. A higher voltage measurement on one cell as compared to another cell may be indicative of a charge disparity among the cells. Other factors may also be used in detecting a charge imbalance.

For purposes of discussion using the monitoring circuitry, assume the pack controller 24 determines that Cell4's voltage is sufficiently lower than all the others to require balancing. Any number of cells, however, might be unbalanced and in some instances some cells will be considered to have too high a voltage whereas other cells might be considered to have too low voltage. A transformer T1 with one (1) primary winding and as many equally wound secondary windings as there are cell modules is used and is operated as a shared inductor in flyback mode. In this example, there are 12 secondary windings (S1-S12), one for each of the 12 cells in the example 38.4 volt pack. The local pack controller or other circuitry connects the primary coil P1 of transformer T1 across the total pack voltage, minus the voltage drop of an isolation diode D1 using a suitable switch SW1 such as a MOSFET, BJT or other device. Current in the primary of T1 may be monitored with a suitable sensor such as a resistor 26 at point BC, a current transformer 28 at point CT, a hall-effect sensor or other device. When the current in T1 has reached an acceptable value, the switch SW1 is opened and the magnetic field that was induced around the primary, collapses around all of the secondary windings S1-S12 until the voltages at each exceeds that of a cell plus the voltage drop of a Schottky diode 30 coupled between the secondary windings S1-S12 and the respectively associated cells cell1-cell12. For this example Cell4 has the lowest voltage, so its Schottky diode 30D will start conducting before any of the others until Cell4's voltage equals that of the other cells within the pack. When the voltages across all of the secondary windings have dropped low enough to turn off all of the diodes 30 connected to them, any excess energy in the transformer core will attempt to discharge through the primary P1 and will be dissipated through the diode D2. This operation is repeated as many times as necessary to achieve a balanced battery pack with all cells at about the same voltage. The charging voltage F may optionally be monitored by means of an additional secondary winding S13 that will reflect the voltage of the charging cell but has no means to determine which cell is being charged. Monitoring circuitry, however, can assess which cell or cells are being balanced.

Referring to FIG. 1, instead of the individual battery pack's own power being used to balance cell charges, external power may be used to accomplish balancing in a similar fashion. With the addition of a transformer T2, which may be a high frequency transformer, a rectifier 32 including diodes R and capacitor C1 in each pack and a shared external transformer H-Bridge Drive circuit, external charge balancing power is provided.

Using the total battery voltage, in this case about 150 volts, alternately switch on H1 and H4, then H2 and H3 using hard or soft switching techniques. If there isn't enough stray inductance from the transformers, optional inductor L1 may be added to enable phase shifting for soft switching. An alternating square wave is sent down the pair of wires A and B to each battery pack wherein it passes through transformer T2 and is rectified using a full wave rectifier including transformer T2 and rectifier 32 in conjunction with capacitor C1. Alternatively, a half wave rectifier as shown in FIG. 1B may be used in place of the full wave configuration of FIG. 1A. In one specific implementation, the turns ratio of the transformer T2 is such that with the source square-wave voltage (the voltage between points C and D (FIG. 1) is always greater than that of a fully charged pack. In this manner, the diode D1 is reversed biased preventing power from being drawn from the pack cells themselves when external power is available. If a charger, such as charger 22, is applied to the whole battery at this time, the diode D1 prevents the battery from pulling power out of itself to balance and instead uses the supply. Each pack may be commanded to balance or not, to a specific cell voltage. Active balancing may also take place during charging or as in the case of hybrid or electric vehicles, while driving and regenerative braking.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

I claim:

1. An apparatus comprising:
   a battery system having a nominal system voltage, the battery system further comprising a plurality of packs each including a plurality of cells, the plurality of packs having nominal pack voltages that when added substantially equal the nominal system voltage;
   an H-bridge circuit having the nominal system voltage as an input from a power source external to the battery system, the H-bridge generating differential alternating square wave voltage outputs provided via a balancing power bus to a plurality of step-down transformers each associated with a pack, the plurality of step-down transformers providing an active balancing voltage of about the associated nominal pack voltage; and
   a plurality of balancing transformers each associated with a respective pack, the plurality of balancing transformers each including a common primary coil receiving the active balancing voltage from the associated step-down transformer or the pack, and a plurality of secondary coils each associated with a respective one or more of the plurality of cells of the respective pack.

2. The apparatus of claim 1 wherein the plurality of secondary coils are each connected across the respective one or more of the plurality of cells of the respective pack.

3. The apparatus of claim 2 further comprising a plurality of diodes for each of the plurality of packs, wherein the plurality of diodes are Schottky diodes with a first Schottky diode of the plurality of Schottky diodes coupled between a first secondary coil of the plurality of secondary coils and a first cell of the plurality of cells.

4. The apparatus of claim 3 wherein the active balancing voltage causes a current flow through the primary coil that induces a voltage in each of the plurality of secondary coils when the current flow is discontinued, and wherein a charge current flows through the first Schottky diode to charge the first cell when the induced voltage exceeds a voltage of the first cell and a voltage drop of the first Schottky diode.

5. The apparatus of claim 4 wherein the charge current flows through the first Schottky diode until the voltage of the first cell is substantially the same as a voltage of a second cell of the plurality of cells, where the second cell initially had a voltage higher than the voltage of the first cell.

6. The apparatus of claim 5 further comprising a diode coupled between the battery system and the primary coil, and at least one controllable switch configured to control the current flow through the primary coil and by discontinuing the current flow in the primary coil transferring a stored energy to induce a voltage rise in the plurality of secondary coils to cause the charge current to charge the first cell.

7. A charge balancing circuit comprising:
   a transformer comprising a primary winding and a plurality of secondary windings, the primary winding coupled across a battery pack, the plurality of secondary windings each connected across a respective discrete portion of the battery pack;
   a plurality of diodes each coupled between each of the plurality of secondary windings and the respective discrete portion of the battery pack;
   at least one switch configured to selectively control current flow from one of an external power source via a balancing power bus and the battery pack through the primary winding whereby discontinuing a current flow through the primary winding causes charge current to flow into at least one of the plurality of discrete portions, wherein the at least one discrete portion has a lesser charge relative to other portions; and
   an isolation diode coupled between the battery pack and the primary winding to prevent the current flow from being drawn from the battery pack when the external power source is available to provide the current flow.

8. The charge balancing circuit of claim 7 wherein the plurality of discrete portions of the battery pack are a plurality of cells of the battery pack, and wherein the at least one of the plurality of discrete portions is at least one first cell of the battery pack having a relatively lower state of charge than at least one second cell of the plurality of cells.

9. The charge balancing circuit of claim 8 wherein the plurality of diodes are Schottky diodes with a first Schottky diode of the plurality of Schottky diodes coupled between a first secondary winding of the plurality of secondary windings and the at least one first cell.

10. The charge balancing circuit of claim 9 wherein discontinuing the current flow through the primary winding induces a voltage in each of the plurality of secondary windings, wherein a charge current flows through the first Schottky diode to charge the first cell when the voltage exceeds a voltage of the first cell and a voltage drop of the first Schottky diode.

11. The charge balancing circuit of claim 10 wherein the charge current flows through the first Schottky diode until the voltage of the first cell is substantially the same as a voltage of the second cell.

12. The charge balancing circuit of claim 7 further comprising a dissipation diode coupled between the primary winding and a ground whereby any remaining energy in a core of the transformer after the induced voltage in the plurality of secondary windings is insufficient to provide the charge current is dissipated through the dissipation diode.

13. The charge balancing circuit of claim 7, wherein the external power source comprises a battery charger configured to provide current to a rectifier, the rectifier configured to supply a charge voltage across the primary winding to supply the current flow through the primary winding.

14. The charge balancing circuit of claim 13 wherein the battery charger includes an H-bridge and the rectifier includes a full-wave rectifier.

15. The charge balancing circuit of claim 13 wherein the battery charger includes an H-bridge and the rectifier includes a half-wave rectifier.

* * * * *